(12) United States Patent
Duong et al.

(10) Patent No.: US 11,572,897 B1
(45) Date of Patent: Feb. 7, 2023

(54) COMPRESSOR WITH CASING TREATMENT

(71) Applicant: PRATT & WHITNEY CANADA CORP., Longueuil (CA)

(72) Inventors: Hien Duong, Mississauga (CA); Vijay Kandasamy, T. Palur (IN)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/374,452

(22) Filed: Jul. 13, 2021

(51) Int. Cl.
*F04D 27/02* (2006.01)
*F04D 29/68* (2006.01)
*F04D 29/52* (2006.01)

(52) U.S. Cl.
CPC ....... *F04D 29/685* (2013.01); *F04D 27/0215* (2013.01); *F04D 29/522* (2013.01); *F05D 2220/323* (2013.01)

(58) Field of Classification Search
CPC ... F04D 29/685; F04D 27/0215; F04D 29/522
See application file for complete search history.

(56) References Cited

U.S. PATENT DOCUMENTS

| | | | |
|---|---|---|---|
| 6,736,594 B2 | 5/2004 | Irie et al. | |
| 10,323,571 B2 * | 6/2019 | Subramanian | F04D 29/542 |
| 10,378,550 B2 * | 8/2019 | Lim | F04D 29/685 |

FOREIGN PATENT DOCUMENTS

| | | |
|---|---|---|
| EP | 2434164 | 3/2012 |
| JP | 2003227497 | 8/2003 |

* cited by examiner

*Primary Examiner* — Sabbir Hasan
(74) *Attorney, Agent, or Firm* — Norton Rose Fulbright Canada LLP.

(57) ABSTRACT

A casing treatment for a compressor includes one or more cavities in a casing disposed radially outwardly of tips of the compressor rotor blades. A liner is moveable relative to the casing between a first position and a second position. The liner is shaped to add a volume to the tip clearance gap when moving from the second position toward the first position. The liner is displaceable between the first and second positions in coordination with at least the rotation of inlet guide vanes (IGVs) between IGV positions.

15 Claims, 5 Drawing Sheets

COMPRESSOR WITH CASING TREATMENT

TECHNICAL FIELD

This application relates generally to aircraft engines and, more particularly, to compressor casings.

BACKGROUND

Casing treatments in the casing walls surrounding compressor rotors in gas turbine engines may be used to improve the surge margin. A common type of casing treatment includes the formation of grooves in the inner surface of the casing wall. The grooves may allow the flow of air to pass over the blade tip, which in turn may enable momentum exchange to energize tip flow as stall is approached. However, the grooves may create losses in the compressor that may impact compressor efficiency.

SUMMARY

There is disclosed a compressor section for an aircraft engine, comprising: a casing enclosing a compressor rotor having compressor rotor blades rotatable about a center axis, and a tip clearance gap extending radially between tips of the compressor rotor blades and the casing; a plurality of inlet guide vanes (IGVs) arranged around the center axis upstream of the compressor rotor and extending radially inwardly of the casing, each IGV of the plurality of IGVs rotatable about a spanwise axis of that IGV between a plurality of IGV positions; one or more cavities in the casing disposed radially outwardly of the tips of the compressor rotor blades; and a liner operatively connected to the casing and moveable relative to the casing between a first position and a second position, the liner shaped to add a volume to the tip clearance gap when moving from the second position toward the first position, the liner being displaceable between the first and second positions in coordination with rotation of the plurality of IGVs between the plurality of IGV positions.

There is disclosed a compressor section of an aircraft engine, the compression section comprising: a casing enclosing a compressor rotor having compressor rotor blades rotatable about a center axis, and a tip clearance gap extending radially between tips of the compressor rotor blades and the casing; a plurality of inlet guide vanes (IGVs) arranged around the center axis upstream of the compressor rotor and extending radially inwardly of the casing, each IGV of the plurality of IGVs rotatable about a spanwise axis of that IGV between a plurality of IGV positions; one or more bleed air passages in fluid communication with the compressor rotor and being selectively closable; and a casing treatment including: one or more cavities in the casing disposed radially outwardly of the tips of the compressor rotor blades; and a liner operatively connected to the casing and moveable relative to the casing between a first position and a second position, the liner shaped to add a volume to the tip clearance gap when moving from the second position toward the first position, the liner displaceable between the first and second positions in coordination with rotation of the plurality of IGVs between the plurality of IGV positions, and in coordination with opening and closing the one or more bleed air passages.

There is disclosed a method of operating a compressor of an aircraft engine, the compressor having compressor rotor blades rotatable about an axis to compress an airstream passing through the aircraft engine via the compressor rotor blades when the aircraft engine is in use, the aircraft engine further having a plurality of inlet guide vanes (IGVs) positioned in the airstream upstream of the compressor rotor blades, the method comprising: rotating the compressor rotor blades about the axis to compress the airstream; rotating the plurality of IGVs about their respective spanwise axes to an IGV position defined relative to the airstream; and increasing tip clearances defined between a casing of the aircraft engine surrounding the compressor rotor blades and respective tips of the compressor rotor blades concurrently with at least a part of the rotating the plurality of IGVs to the IGV position.

There is disclosed a compressor section for an aircraft engine, comprising: a casing enclosing a compressor rotor having compressor rotor blades rotatable about a center axis, and a tip clearance gap extending radially between tips of the compressor rotor blades and the casing; one or more cavities in the casing disposed radially outwardly of the tips of the compressor rotor blades; and a liner operatively connected to the casing and moveable relative to the casing between a first position and a second position, the liner shaped to add a volume to the tip clearance gap when moving from the second position toward the first position, the volume being radially outwardly of the casing.

DESCRIPTION OF THE DRAWINGS

Reference is now made to the accompanying figures in which.

DETAILED DESCRIPTION

Figure 1:
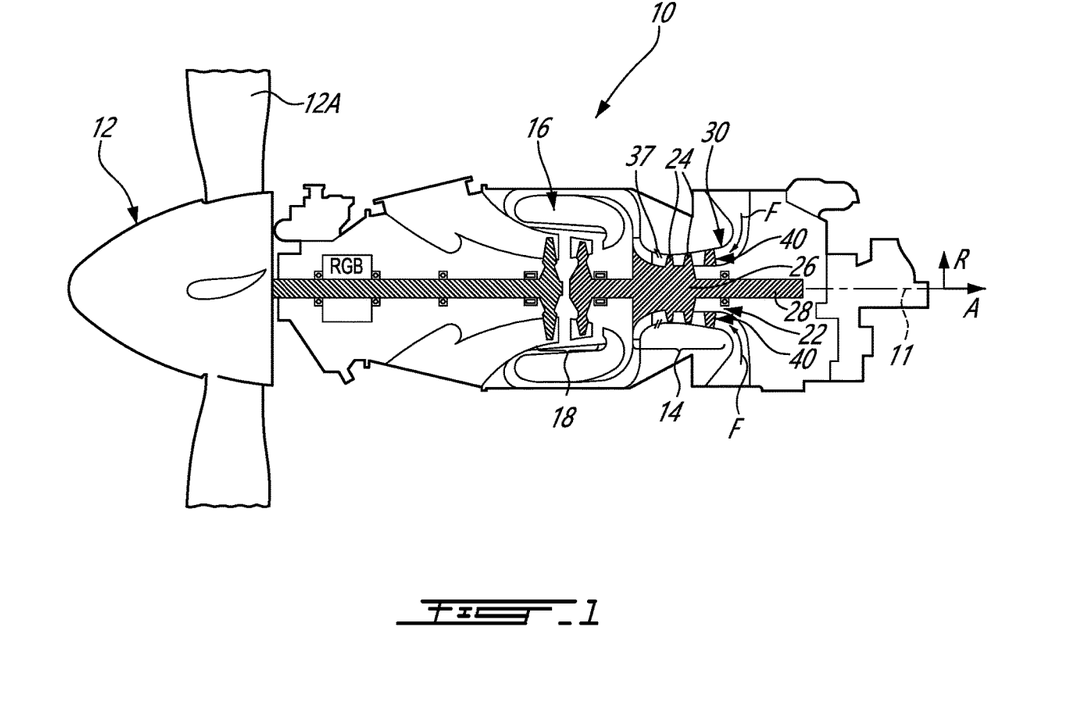
FIG. 1 is a schematic cross sectional view of an aircraft engine.

FIG. 1 illustrates an aircraft engine 10 of a type preferably provided for use in subsonic flight, generally comprising in serial flow communication a compressor section 14 for pressurizing the air, a combustor 16 in which the compressed air is mixed with fuel and ignited for generating an annular stream of hot combustion gases, and a turbine section 18 for extracting energy from the combustion gases. The turbine section 18 drives a rotatable load, such as a propeller 12 with propeller blades 12A, about a longitudinal center axis 11 of the engine 10. The center axis 11 defines an axial direction A and a radial direction R.

The compressor section 14 includes one or more compressor rotors 22 (only one being shown for clarity). The compressor rotor 22 includes a plurality of circumferentially distributed compressor rotor blades 24 extending radially from an annular hub 26. The hub 26 is supported by a shaft 28 for rotation about the center axis 11 of the engine 10. An annular compressor casing 30 (also known as a shroud, or compressor shroud) surrounds the compressor rotor blades 24. The hub 26 and annular casing 30 define inner and outer boundaries, respectively, for channeling a flow of air F of an airstream through the compressor 14. The flow of air F is generally aligned with the center axis 11. In the configuration of the engine 10 shown in FIG. 1, the compressor rotor 22 is an axial-flow compressor rotor 22. The compressor rotor 22 may be a centrifugal compressor rotor 22 (also known as an impeller).

Figure 2A:
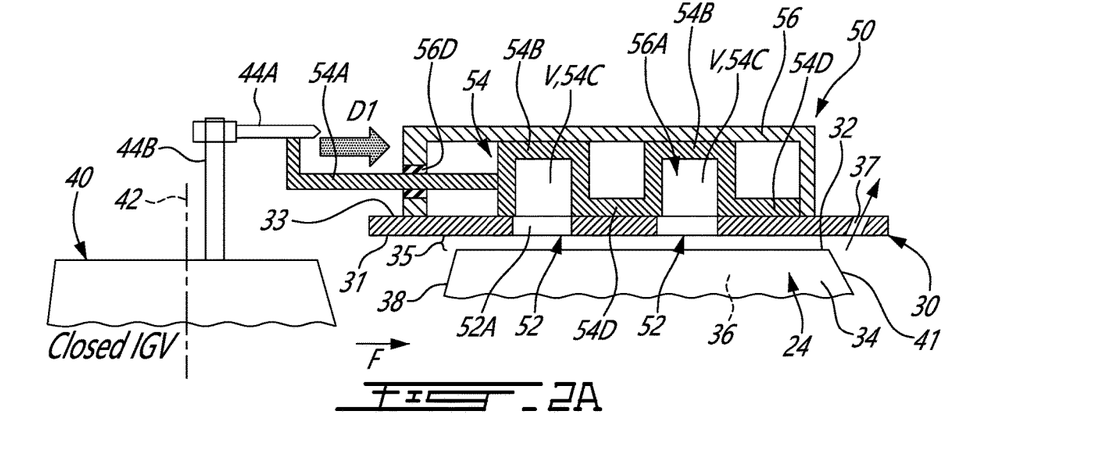
FIG. 2A is a schematic cross sectional view of part of the aircraft engine of FIG. 1, showing a casing treatment in one position.

Referring to FIG. 2A, the compressor casing 30 (sometimes referred to herein simply as "casing 30") is a revolute body about the center axis 11 that defines an interior volume. The casing has an inner wall 31 that faces the compressor rotor blades 24 (sometimes referred to herein simply as "blades 24"), and an outer wall 33 that is positioned radially outwardly of the inner wall 31 and defines an outer surface of the casing 30. A radial thickness of the casing 30 is defined between the inner and outer walls 31,33. Referring to FIG. 2A, each of the blades 24 is airfoil shaped and includes a pressure side 34 and an opposed suction side 36, and a leading edge 38 and a trailing edge 41 defined at the junction of the pressure side 34 and the suction side 36.

A tip 32 of the blade 24 is spaced radially from the inner wall 31 of the casing 30 to provide a tip clearance gap 35. The tip clearance gap 35 (sometimes referred to herein simply as "tip clearance 35") is an annular volume defined around the center axis 11. The flow or air F may leak through the tip clearance gap 35 which may reduce performance and aerodynamic stability of the compressor section 14 (i.e. detrimental to engine fuel consumption and surge margin). The tip clearance gap 35 may not be constant over time and may even increase. For example, the radial thickness of the tip clearance gap 35 may temporary increase during transient gas turbine engine operation. In another example, the tip clearance gap 35 may permanently increase from wear over the life of the engine 10.

Referring to FIG. 2A, the compressor section 14 includes one or more bleed air passages 37. The bleed air passages 37 are in fluid communication with the compressor rotor 22. The bleed air passages 37 are positioned downstream of the compressor rotor 22 to receive the pressurized flow of air F. The bleed air passages 37 may also be positioned elsewhere relative to the compressor rotor 22. The bleed air passages 37 are conduits or volumes which allow some of the pressurized flow of air F to be evacuated, or "bled", from the annular volume defined by the inner and outer boundaries of the hub 26 and casing 30. Referring to FIG. 2A, the illustrated bleed air passage 37 is an opening or conduit in the casing 30, such that some of the flow of air F is bled radially outwardly of the casing 30. Other configurations for the bleed air passages 37 are possible and within the scope of the present disclosure. For example, each bleed air passage 37 may be configured to bleed some of the flow of air F radially inwardly toward or past the hub 26. Each of the bleed air passages 37 is selectively closable, such they can be opened to bleed some flow of air F or closed to stop bleeding of the flow of air F. This individual control of the bleed air passages 37 may allow for different bleeding along the compressor gas path. In an embodiment, all of the bleed passages 37 are open and bleed some of the flow of air F into one common chamber or plenum, which is itself selectively closeable such that it can be closed or opened as required. The bleed air passages 37 are selectively closable in response to certain engine operating conditions. Alternatively, one or more of the bleed air passages 37 may be selectively closable automatically, such as in response to changes in pressure within the casing 30. The bleed air passages 37 are shown and described herein as being operable between open and closed positions, but they may also be modulated or controlled to operate at any position between the open and closed positons.

Referring to FIG. 2A, the compressor section 14 includes multiple inlet guide vanes (IGVs) 40. The IGVs 40 are positioned axially upstream of the compressor rotor 22 and blades 24, relative to the flow of air F of the airstream. The IGVs 40 are circumferentially distributed about the center axis 11. The IGVs 40 define inlet flow passages in order to guide an inlet air flow into the blades 24. The IGVs 40 may be circumferentially evenly or unevenly spaced. The IGVs 40 radially extend between, and may be supported by, the casing 30 and/or the hub 26. The IGVs 40 are variable IGVs 40, in that they are rotatable about a respective radial or spanwise axis 42 to change their setting angles in order to adjust the inlet flow entering the blades 24. Each of the IGVs 40 may have an airfoil profile including leading and trailing edges, and pressure and suction surfaces, extending between the leading and trailing edges.

Figure 5:
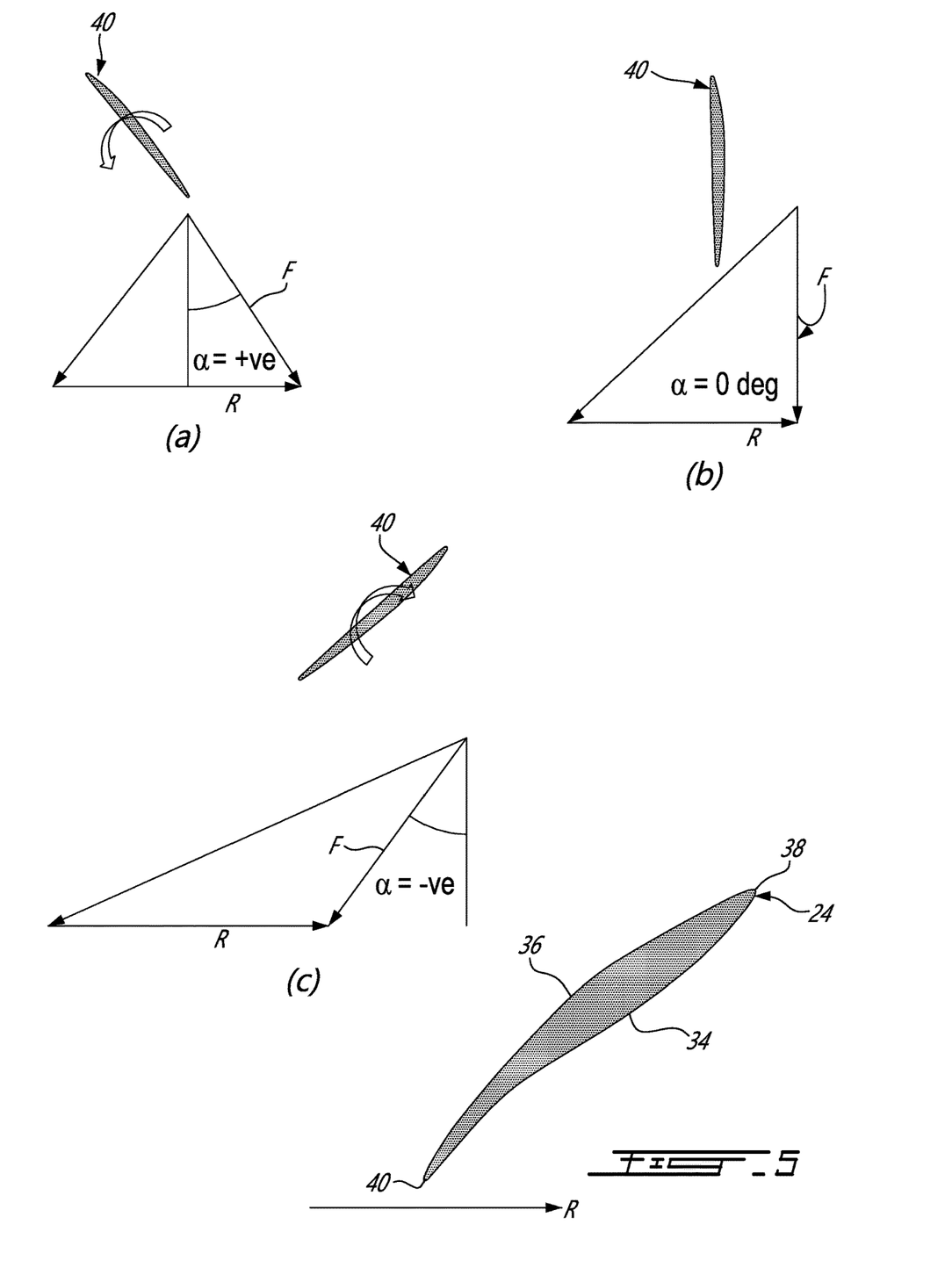
FIG. 5 is a schematic illustration of flow vectors for different positions of the IGVs.

As above-described, the variable IGVs 40 are rotatable about the spanwise axis 42 to different IGV positions. Each of the IGV positions is a position of the IGVs 40 that is defined relative to the oncoming flow of air F. The IGVs 40 may be rotated to provide a maximum closing setting angle which may vary from 50 to 70 degrees and is referred to as "closed" IGV position, and a maximum open setting angle which may vary from 15 to 25 degrees and is referred to as an "open" IGV position. A design point setting angle of the IGVs 40 is referred to as a "zero" IGV position, although small angle magnitudes are also possible for the design point setting. Referring to FIG. 5, the IGV 40 shown in subset (a) is the closed IGV position, the IGV 40 shown in subset (b) is the zero IGV position, and the IGV 40 shown in subset (c) is the open IGV position. It will be appreciated that the IGV position of one or more of the IGVs 40 may differ from the IGV position of another IGV 40.

Different mechanisms may be used to rotate the IGVs 40 between and/or to the IGV positions. For example, and referring to FIG. 2A, an actuator 44A engages a radially-extending rod 44B that is coupled at a radially-lower end to one of the IGVs 40. The IGVs 40 may be supported in position by the rod 44B, in addition to, or alternatively from, any support provided by the casing 30 and/or hub 26 to the IGVs 40. The actuator 44A displaces, and through appropriate links and/or gearing with the rod 44B, causes the rod 44B to rotate the IGV 40 about the spanwise axis 42 between the IGV positions. The movement of the actuator 44A, and thus the movement of the IGVs 40, may be governed by an engine controller. Other mechanisms for rotating the IGVs 40 are possible.

Figure 4:
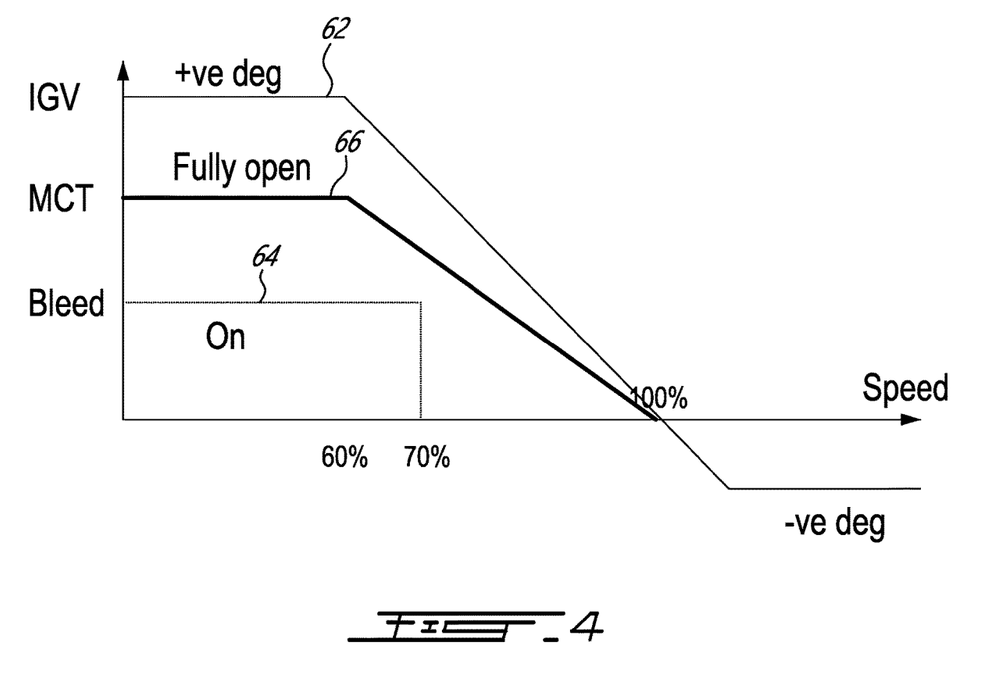
FIG. 4 is a plot showing the positions of inlet guide vanes (IGVs), a casing treatment, and bleed air passages as a function of engine speed.

Referring to FIG. 4, the bleed air passages 37 are selectively closable and the IGVs 40 are rotatable between the open and closed IGV positions, according to a bleed air schedule 64 and to an IGV schedule 62, respectively. FIG. 4 shows some possible examples of the bleed air schedule 64 and the IGV schedule 62. Each bleed air schedule 64 is set according to a speed of the engine 10 (as defined below), with different bleed air schedules 64 provided for different altitudes at which the engine 10 carried by an aircraft may operate. In the example of the bleed air schedule 64 shown in FIG. 4, the bleed air passages 37 are fully open, or the bleed air is "on", from 0 to approximately 70% engine speed, for example. In the example of the bleed air schedule 64 shown in FIG. 4, the bleed air passages suddenly close, or bleed air is "off", as the speed of the engine 10 attains approximately 70% engine speed. At engine speeds higher than 70%, the bleed air remains off. As mentioned above, bleed air may be modulated rather than simply on/off, such that bleed air can be tapered toward off as the speed of the engine 10 increases. Similarly, each IGV schedule 62 is set according to a speed of the engine 10, with different IGV schedules 62 provided for different altitudes at which the engine 10 carried by an aircraft may operate. In the example of the IGV schedule 62 shown in FIG. 4, the IGVs 40 are in the closed IGV position from 0 to approximately 60% engine speed, for example, and have a positive degree angle value. In the example of the IGV schedule 62 shown in FIG. 4, the IGVs 40 gradually rotate to the open IGV position as the speed of the engine 10 increases, and have a zero degree angle value at approximately 100% engine speed. 100% engine speed may be defined as the compressor corrected design speed which normally is at an engine high power setting—for example at altitude cruise or sea level take-off power. The speed is corrected to a sea level standard day temperature and pressure. All engine speeds mentioned herein may be corrected engine speeds. At engine speeds higher than 100%, the IGV schedule 62 shows that the IGVs 40 have negative angle values. Alternatively, the IGVs 40 may switched from positive to negative angle values at engine speeds other than 100%.

It may be preferable to provide the compressor rotor 22 with greater loading in order to minimize engine length, weight and cost. However, the ability for the compressor section 14 to provide greater pressure rise with fewer stages come with penalties on performance and on compressor range. To combat loss of range on the compressor rotor 22, a casing treatment 50 may be provide. The casing treatment 50 (sometimes referred to herein simply as "CT 50") may come in different forms, examples of which are now described.

Referring to FIG. 2A, the casing treatment 50 is a feature, modification or attribute of the casing 30, or provided thereto, that contributes to improved performance of the compressor section 14. Referring to FIG. 2A, the CT 50 includes one or more cavities 52 in the casing 30. The cavities 52 are positioned radially outwardly of the tips 32 of the blades 24. The cavities 52 are axially aligned with the tips 32 of the blades 24. The cavities 52 are positioned on the casing 30 axially between the leading and trailing edges 38,41 of the blades 24. The cavities 52 may extend circumferentially about the center axis 11 as continuous volumes, or may define discrete volumes that are circumferentially spaced apart. The cavities 52 extend axially parallel to the center axis 11. Referring to FIG. 2A, each of the cavities 52 is an opening 52A or aperture that extends through the casing 30 between the inner and outer walls 31,33. In an alternate embodiment, an example of which is described in greater detail below, each of the cavities 52 is a recess, indentation, or groove 52B which extends circumferentially and into the casing from the inner wall 31, but which does not extend through the casing 30. The cavities 52 may be of any suitable shape or size, and have different axial widths.

Referring to FIG. 2A, the CT 50 includes a liner 54 that is displaceable relative to the casing 30. The liner 54 is coupled or attached to the casing 30 in any suitable manner which allows for its displacement relative to the casing 30. The CT 50 is thus a moving casing treatment 50. The liner 54 may take different forms, examples of which are described herein. Irrespective of its form, the liner 54 is shaped or configured to add to the volume of, or increase, the tip clearance 35. The liner 54 in FIG. 2A is positioned outside of the casing 30. The liner 54 is positioned adjacent to the outer wall 33 of the casing 30, and is displaceable relative to the outer wall 33. The liner 54 is displaceable relative to the casing 30 between a first position and a second position.

The first position of the liner 54 is shown in FIG. 2A, in which the liner 54 is shaped such that parts of the liner 54 are spaced apart from the cavities 52 so as to reveal or unblock the cavities 52. In the first position, the liner 54 exposes the cavities 52 and creates a volume V. The volume V is in fluid communication with the flow of air F in the tip clearance 35, such that the volume V is added to the volume of the tip clearance 35. It may be said that the addition of the volume V in the first position increases the tip clearance 35. The added volume in the first position allows the CT 50 to act like a conventional static casing treatment in which stationary grooves are machined into casing wall, and thereby helps to increase the stall margin and range of the compressor section 14. Referring to FIG. 2A, the openings 52A are unobstructed by the liner 54 along the inner wall 31, such that the openings 52A are always in fluid communication with the tip clearance 35. It will be appreciated that the tip clearance 35, with or without the added volume V, may be different for different blades 24.

Figure 2B:
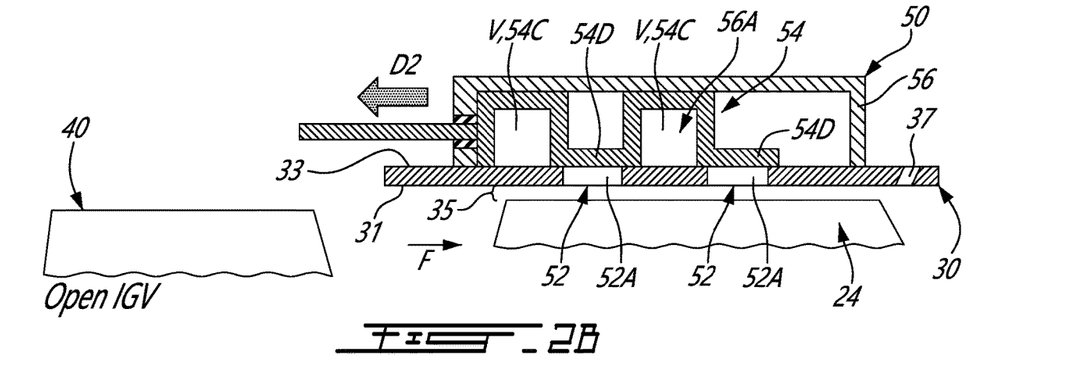
FIG. 2B is a schematic cross sectional view of the casing treatment of FIG. 2A, showing the casing treatment in another position.

The second position of the liner 54 is shown in FIG. 2B, in which parts of the liner 54 block or obstruct the cavities 52. In the second position, the liner 54 confines the flow of air F to the cavities 52 and blocks off the volume V. The CT 50 in the second position allows the compressor section 14 to perform as if it had no casing treatment. The absence of a casing treatment may be beneficial to the performance of the compressor section 14 at some steady state engine operating conditions, such as aircraft cruise, as explained in greater detail below. The CT 50 disclosed herein is thus a dynamic CT 50, as opposed to some conventional static or immobile casing treatments. The CT 50 disclosed herein is controllable, and may thus be referred to as modulated CT 50.

The displacement of the liner 54 between the first and second positions is coordinated with the rotation of the IGVs 40 between the IGV positions. There is a relationship between the position of the liner 54 and the position of the IGVs 40 during operation of the engine 10, and examples of this relationship are provided below. The integration of the controllable casing treatment 50 with the IGV schedule 62 and/or the bleed air schedules 64 provides the compressor section 14 with another parameter that may be selected to further enhance the performance and range of the compressor section 14. Thus, better performance and improved operability over the entire operating envelope of the compressor section 14 may be achieved when the IGVs 40, the CT 50, and/or the bleed air functionality are integrated together. The CT 50 is thus a variable casing treatment 50 on the rotor shroud 30 that can be modulated between "on" and "off" positions in order to extend the range of the compressor section 14 while reducing losses in performance at engine operating conditions where CT is no longer required or desired.

Referring to FIG. 4, the liner 54 may be displaceable according to a liner schedule 66. Similarly to the IGV and bleed air schedules 62,64, each liner schedule 66 is set according to a speed of the engine 10, with different liner schedules 64 provided for different altitudes at which the engine 10 carried by the aircraft may operate. In the example of the liner schedule 66 shown in FIG. 4, the liner 54 is in the first or open position of FIG. 2A from 0 to approximately 60% engine speed, for example. In the example of the liner schedule 66 shown in FIG. 4, the liner 54 gradually displaces or transitions to the second or closed position of FIG. 2B as the speed of the engine 10 increases, and is fully closed and in the second position at approximately 100% engine speed. Thus, in order to optimize performance and range of the compressor section 14, the liner 54 may be displaced according to a liner schedule 66 in coordination with operation of the bleed air passages 37 and the IGVs 40 according to their respective bleed air schedules 64 and IGV schedules 62. In an embodiment, and referring to FIG. 4, the IGV and liner schedules 62,66 undergo changes of state or position at the same engine speeds. In an alternative embodiment, the IGV and liner schedules 62,66 undergo changes of state or position at different engine speeds.

Examples of the coordinated displacement of the liner 54 and the IGVs 40 are now described. Referring to FIG. 2A, the liner 54 is in the "open" first position and the volume V is added to the tip clearance gap 35 when the IGV position of the IGVs 40 is closed. By closed IGV position, it is understood that the flow of air F to the blades 24 is restricted by the IGVs 40. When the IGVs 40 are in the closed IGV position, the flow of air F will encounter more of the frontal area of the pressure or suction sides of the IGVs 40 compared to when the IGVs 40 are open. For example, when the IGVs 40 are in the closed IGV position, the direction of the flow of air F from the IGVs 40 and into compressor rotor 20 is more toward the suction side 36 of the blades 24 (see FIG. 5, subset (a), where the vector for the flow of air F is more biased toward the suction side 36). Thus, when the IGVs 40 are in the closed IGV position, less of the flow or air F reaches the compressor rotor 22. In the convention used in the present disclosure, closed IGV positons correspond to the IGVs 40 having a positive angle, as shown in FIG. 4 and described in greater detail below. Thus, in the first positon of the liner 54, the CT 50 is fully opened and the IGVs 40 are in the closed IGV position, such that the liner 54 and the IGVs 40 have an inverse positional relationship. This coordinated displacement of the liner 54 and the IGVs 40 may be appropriate at lower or transient engine speeds (e.g. in the range of 0-60% engine speed, or even higher such as up to 80% engine speed), where they may be more of a risk of surge in the compressor section 14.

Another example of the coordinated displacement of the liner 54 and the IGVs 40 is now described. Referring to FIG. 2B, the liner 54 is in the "closed" second position and the volume V is blocked off from tip clearance gap 35 when the IGV position of the IGVs 40 is open. By open IGV position, it is understood that the flow of air F to the blades 24 is substantially unrestricted by the IGVs 40. When the IGVs 40 are in the open IGV position, the flow of air F will encounter very little of the frontal area of the pressure or suction sides of the IGVs 40 compared to when the IGVs 40 are closed. When the IGVs 40 are in the open IGV position, the flow of air F will encounter the leading edges of the IGVs 40. Thus, when the IGVs 40 are in the open IGV position, most of the flow or air F reaches the compressor rotor 22. In the convention used in the present disclosure, open IGV positons correspond to the IGVs 40 having a negative angle, as shown in FIG. 4 and described in greater detail below. Thus, in the second positon of the liner 54, the CT 50 is fully closed and the IGVs 40 are in the open IGV position, such that the liner 54 and the IGVs 40 have an inverse positional relationship. This coordinated displacement of the liner 54 and the IGVs 40 may be appropriate at higher engine speeds (e.g. greater than 60% engine speed), such as when the engine 10 is powering the aircraft in steady-state operations like cruise, where they may be lower risk of stall and engine 10 performance is important.

Figure 2C:
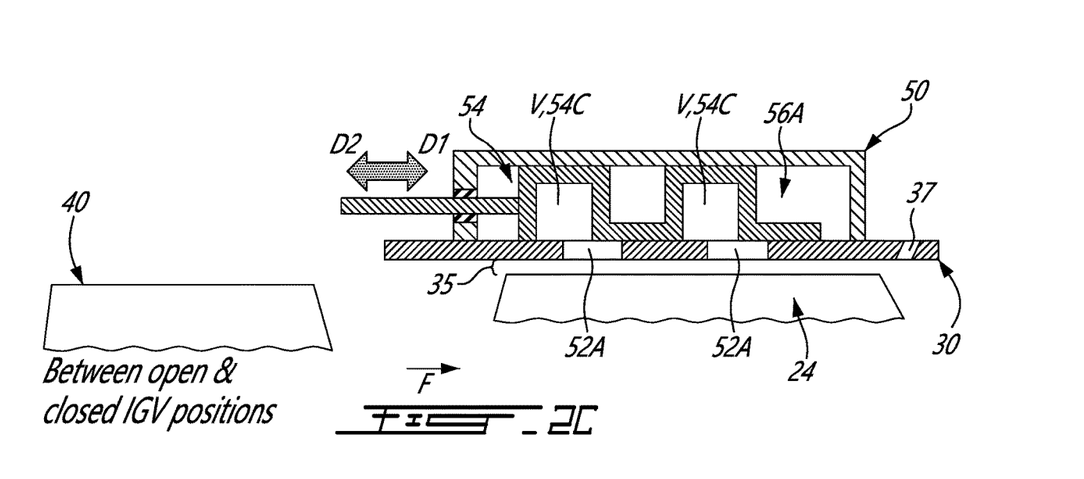
FIG. 2C is another schematic cross sectional view of the casing treatment of FIG. 2A, showing the casing treatment in another position.

Another example of the coordinated displacement of the liner 54 and the IGVs 40 is now described. Referring to FIG. 2C, the liner 54 is between the "open" first position and the "closed" second position when the IGV position of the IGVs 40 is between open and closed, such that part of the volume V is added to the volume of the tip clearance gap 35. Thus, only some of the flow of air F to the blades 24 is restricted by the IGVs 40. Thus, in this partial positon of the liner 54, the CT 50 is partially closed and the IGVs 40 are between the open and closed IGV positions. This coordinated displacement of the liner 54 and the IGVs 40 may be appropriate at mid-speed engine conditions to best optimize the performance and/or operability of the compressor rotor 22. It will be appreciated that the liner 54 may arrive at the first or second positions before, after, or simultaneously to when the IGVs 40 arrive at their respective closed or open IGV positions. Furthermore, the liner 54 may be in the first or second positions for a duration less than, greater than, or equal to, the time it takes the IGVs 40 to transition between the IGV positions.

In addition to being coordinated with the rotation of the IGVs 40 between the IGV positions, the displacement of the liner 54 between the first and second positions can also be coordinated with the opening and closing of the bleed air passages 37. There is thus a relationship between the position of the liner 54, the bleed air functionality, and the position of the IGVs 40 during operation of the engine 10. Closing or opening the casing treatment 50 can be performed according to the schedules 62,64 which govern the movement of the IGVs 40 and the bleeding of air from the compressor section 14. The present disclosure thus relates to a casing treatment 50 for a compressor rotor 22 that can operate either individually, or in sync with bleeding air and the operation of the IGVs 40. The present disclosure allows for the integration of the CT 50, the operation of the IGVs 40, and the operation of bleed air into one controllable configuration. Examples of this relationship are provided below.

Referring to FIG. 2A, the liner 54 is in the "open" first position and the volume V is added to the tip clearance gap 35 when the IGV position of the IGVs 40 is closed and when the bleed air passages 37 are open to bleed some of the flow of air F out of the casing 30. This coordinated operation of the liner 54, the bleed air passages 37 and the IGVs 40 may be appropriate at lower or transient engine speeds (e.g. in the range of 0-60% engine speed, or even up to 80% engine speed), in order to best counter a potential stall margin problem in the compressor section 14.

Another example of the coordinated operation of the liner 54, the bleed air passages 37, and the IGVs 40 is now described. Referring to FIG. 2B, the liner 54 is in the "closed" second position and the volume V is blocked off from the tip clearance gap 35 when the IGV position of the IGVs 40 is open and when the bleed air passages 37 are closed to prevent bleeding some of the flow of air F out of the casing 30. This coordinated operation of the liner 54, the bleed air passages 37 and the IGVs 40 may be appropriate at higher engine speeds (e.g. greater than 60% engine speed for high engine power settings), such as when the engine 10 is powering the aircraft in steady-state operations like cruise, where they may be little risk of stall and engine 10 performance is important.

The coordinated operation of the liner 54, the bleed air passages 37, and the IGVs 40 allows for the bleed air to be used up to a certain engine speed, after which bleed air is disabled. At lower engine speeds, the IGVs 40 are in a closed IGV position and the bleed air is active, but above a certain speed only the IGVs 40 are used to improve compressor surge margin. The modulated CT 50 disclosed herein allows to avoid the performance loss at cruise engine speeds associated with conventional casing treatments that are always "open", because the CT 50 may be closed at such higher engine speeds.

The engine 10 may have a mechanical link which coordinates the movement/operation of the IGVs 40, the liner 54 and/or the bleed air passages 37. Referring to FIG. 2A, the actuator 44A displaces, and through appropriate links and/or gearing with the rod 44B, causes the rod 44B to rotate the IGV 40 about the spanwise axis 42 between the IGV positions. The actuator 44A is linked to a displacement rod or a liner rod 54A. The liner rod 54A has one portion coupled to the actuator 44A, and another portion coupled to the liner 54. The actuator 44A displaces, and through appropriate links and/or gearing with the liner rod 54A, causes the liner rod 54A to axially slide or displace the liner 54 between the first and second positions. The liner rod 54A may be an annular ring. The IGVs 40 and the liner 54 are thus displaced simultaneously, using the same mechanism. The casing treatment 50 may thus operate in sync with the IGVs 40, and possible also operate in sync with the mechanism used to open and close the bleed air passages 37. The CT 50 can employ the same actuator 44A of the IGVs 40, thereby potentially minimising part count. In an alternate embodiment, the liner 54 of the CT 50 has a dedicated mechanism to displace the liner 54, or the liner 54 is actuatable independently of the movement of the IGVs 40 and/or of the bleed air functionality.

The CT 50 may take different forms. One possible form for the CT 50 is shown in FIG. 2A. The CT 50 includes an enclosure 56. The enclosure 56 is part of the casing 30, or may be a separate component joined to the casing 30. The enclosure 56 may be an annular body circumferentially extending about the center axis 11. The enclosure 56 extends radially outwardly from the outer wall 33 of the casing 30. The enclosure 56 is sealed against the outer wall 33 of the casing 30. By "sealed", it is understood that the enclosure 56 delimits an enclosure plenum 56A that is fluidly separate from the volume of air outside of the casing 30. The enclosure 56 is fixedly attached, or fixed in relation to, the casing 30. The enclosure 56 is positioned radially outwardly of the openings 52A in the casing 30, and covers or radially overlaps the openings 52A.

Referring to FIG. 2A, the liner 54 is displaceable between the first and second positions by sliding in an axial direction D1 within the enclosure plenum 56A and relative to the enclosure 56. In the first position of the liner 54, the openings 52A fluidly connect part of the enclosure plenum 56A to the tip clearance gap 35. As the liner 54 axially slides in the direction D2 toward the second position, the openings 52A are gradually blocked off and the enclosure plenum 56A is prevented from fluidly connecting to the tip clearance gap 35, as shown in FIG. 2B. Referring to FIG. 2A, the liner 54 includes one or more liner enclosures 54B. The liner enclosures 54B are bodies positioned outside of the casing 30, and define internal volumes or liner enclosure plenums 54C radially outwardly of the outer wall 33. The liner enclosures 54B are disposed within the enclosure 56, such that the liner enclosure plenums 54C form part of the enclosure plenum 56A. The liner enclosures 54B are displaceable with the liner 54 between the first and second positions. Referring to FIG. 2A, the CT 50 thus has liner enclosure plenums 54C which sit radially outwardly of the compressor shroud and form shapes similar to those of conventional casing treatments. The shape, configuration, orientation relative to the center axis 11, and number of the liner enclosures 54B may be different than the box-like structures shown in FIG. 2A. The liner 54 has one or more blocking portions 54D that are positioned between two adjacent liner enclosures 54B. Referring to FIG. 2A, each blocking portion 54D extends in a direction parallel to the center axis 11 and between adjacent liner enclosures 54B. The blocking portions 54D are positioned radially closer to the center axis 11 than the most of the liner enclosure 54B.

Referring to FIG. 2A, in the open, first position of the liner 54, the liner plenum 54C of each liner enclosure 54B is in fluid communication with the tip clearance gap 35 via one of the openings 52A. In the first position, the liner 54 adds volume V outside of the casing 30 to the volume of tip clearance gap 35. The flow of air F is thus free to circulate into and out of the liner plenum 54C. In the first position, the blocking portions 54D abut against the outer wall 33 of the casing 30 and do not obstruct the openings 52A. Referring to FIG. 2B, in the closed, second position of the liner 54, the blocking portions 54D cover or block the openings 52A and prevent the flow of air F from entering the enclosure plenum 56A. In the second position, the liner enclosures 54B are sealed against the outer wall 33 of the casing 30, so as to seal off the liner enclosure plenum 54C from a remainder of the volume of the enclosure plenum 56A. In the configuration of the liner 54 shown in FIGS. 2A to 2C, the openings 52A are blocked from fluid communication with the volume of the enclosure plenum 56A outside of the liner enclosure plenums 54C, irrespective of the position of the liner 54. Referring to FIG. 2A, the liner rod 54A extends partly within the enclosure 56 to couple with one or more of the liner enclosures 54B, and also extends outside of the enclosure 56 and outside the casing 30 to couple with the actuator 44A. In order to maintain the fluid isolation of the enclosure plenum 56A, the enclosure 56 includes a seal 56D applied between the liner rod 54A and corresponding structure of the enclosure 56. The liner rod 54A is thus a pushing/pulling rod 54A that is connected to the movable CT 50, and that is sealed at one end of enclosure plenum 56A.

Figure 3A:
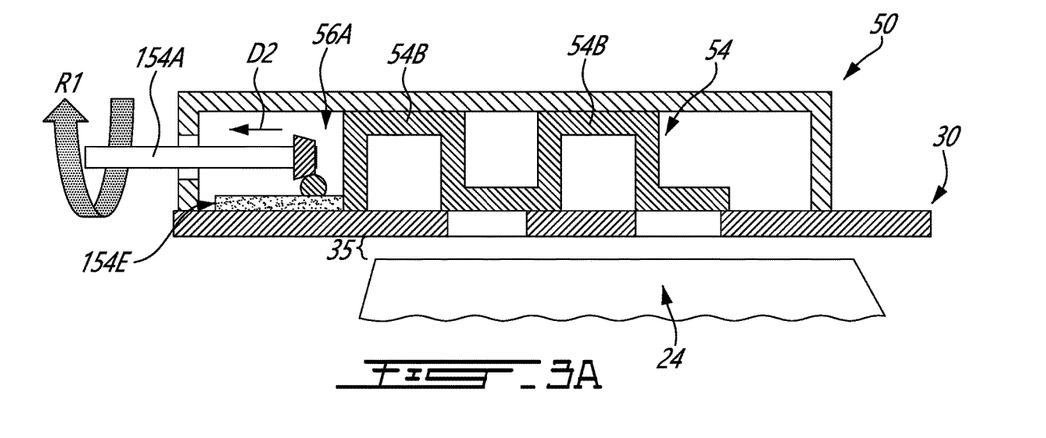
FIG. 3A is a schematic cross sectional view of part of the aircraft engine of FIG. 1, showing another casing treatment in one position.
Figure 3B:
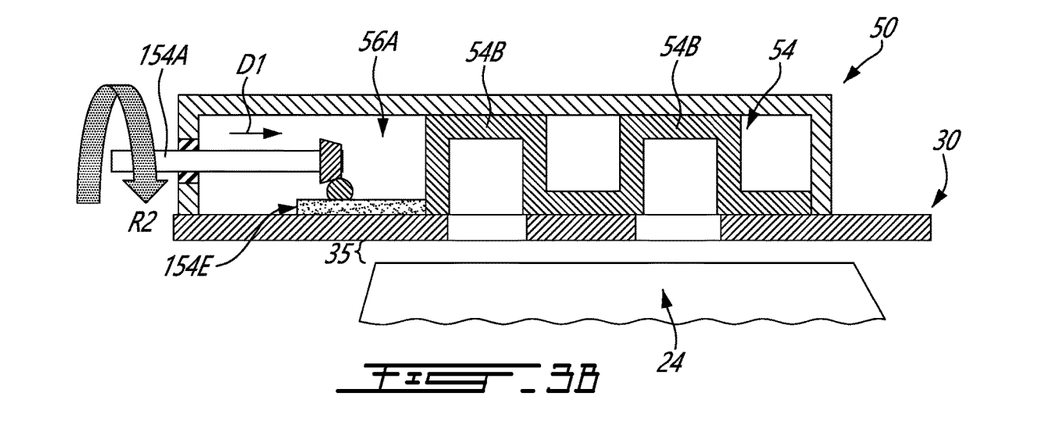
FIG. 3B is a schematic cross sectional view of the casing treatment of FIG. 3A, showing the casing treatment in another configuration.

Yet another possible form for the CT 50 is shown in FIGS. 3A and 3B. Elements shown in FIGS. 3A and 3B which are similar to those shown in FIGS. 1 to 2C have similar reference numbers, and the description above of elements shown in FIGS. 1 to 2C applies mutatis mutandis to similar elements shown in FIGS. 3A and 3B. In the configuration of the CT 50 shown in FIGS. 3A and 3B, the liner rod 154A is rotatable. The liner rod 154A has a distal end within the enclosure plenum 56A which is geared, and which engages a rack and pinion system 154E. The rack and pinion system 154E is coupled to one or more of the liner enclosures 54B and is displaceable relative to the casing 30. The actuator 44A rotates the liner rod 154A, which causes the rack and pinion system 154E, and thus the liner 54, to displace in the directions D1, D2. For example, and referring to FIG. 3A, the actuator 44A rotates the liner rod 154A in a first rotation direction R1 to axially displace the rack and pinion system 154E and the liner 54 in the direction D2 to the closed, second position. Referring to FIG. 3B, the actuator 44A rotates the liner rod 154A in a second rotation direction R2 opposite to the first rotation direction R1 to axially displace the rack and pinion system 154E and the liner 54 in the direction D1 to the open, first position.

Figure 3C:
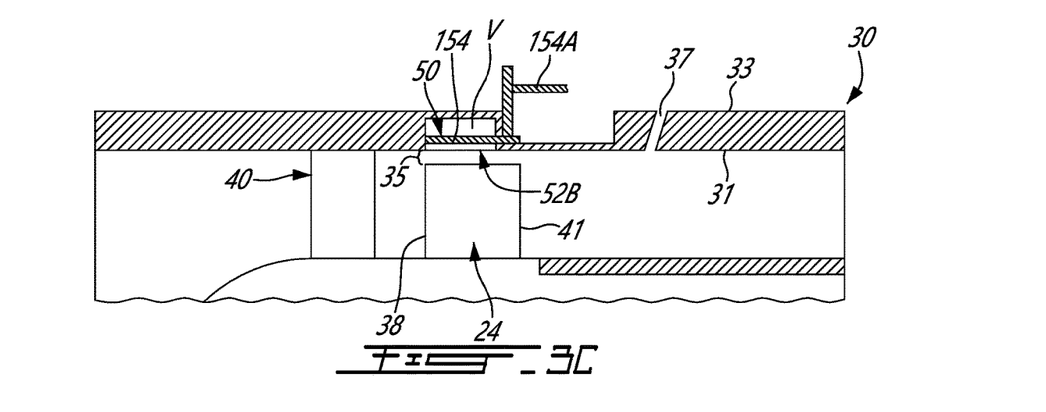
FIG. 3C is a schematic cross sectional view of another casing treatment of the aircraft engine of FIG. 1.

Yet another possible form for the CT 50 is shown in FIG. 3C. Elements shown in FIG. 3C which are similar to those shown in FIGS. 1 to 3B have similar reference numbers, and the description above of elements shown in FIGS. 1 to 3B applies mutatis mutandis to similar elements shown in FIG. 3C. In the configuration of the CT 50 shown in FIG. 3C, the one or more cavities 52 in the casing 30 are recesses, indentations, or grooves 52B which extend into the casing 30 from the inner wall 31, but which do not extend through the casing 30. The liner 154 is a planar body extending in an axial direction, and is displaceable by the liner rod 154A to block and expose the grooves 52B. The liner 154 is located in part of the radial thickness of the casing 30. In the closed, second position of the liner 154, the liner 154 blocks the grooves 52B and fluidly separates the volume V of the grooves 52B from the tip clearance gap 35. In the open, first position of the liner 154, the liner 154 exposes the grooves 52B and adds the volume V of the grooves 52B to the volume of the tip clearance gap 35.

FIG. 5 shows velocity flow diagrams for the flow of air F through the IGVs 40. The compressor rotor blade 24 rotates about the center axis 11 in the direction R. Referring to subset (a), the IGV 40 shown is in the closed IGV position, and has a positive angle $\alpha$ in the convention used in the present disclosure, in which the positive angle $\alpha$ is defined in the direction of rotor rotation R. Referring to subset (b), the IGV 40 shown is in the zero IGV position (i.e. between the open and closed position), and has a zero angle $\alpha$ in the convention used in the present disclosure. Referring to subset (c), the IGV 40 shown is in the open IGV position, and has a negative angle $\alpha$ in the convention used in the present disclosure.

Referring to FIGS. 2A to 2B, there is disclosed a method of operating the compressor rotor 22. The method includes rotating the compressor rotor blades 24 about the axis 11 to compress the airstream or flow of air F. The method includes rotating the IGVs 40 about their respective spanwise axes 42 to an IGV position defined relative to the airstream. The method includes increasing tip clearances 35 concurrently with at least a part of the rotating the plurality of IGVs 40 to the IGV position.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the casing treatment 50 disclosed herein may be used independently, and without coordination with the rotation of the IGVs 40 or with the bleed air functionality. For example, the casing treatment 50 disclosed herein may be used in coordination with one of, or both of, the rotation of the IGVs 40 and the bleed air functionality. The casing treatment 50 disclosed herein may be used with any type of aero engine, including turbojets and turbofans, with axial or reverse flow engines, and with axial-flow compressor rotors. Yet further modifications could be implemented by a person of ordinary skill in the art in view of the present disclosure, which modifications would be within the scope of the present technology.

The invention claimed is:

1. A compressor section for an aircraft engine, comprising:
   a casing enclosing a compressor rotor having compressor rotor blades rotatable about a center axis, and a tip clearance gap extending radially between tips of the compressor rotor blades and the casing;
   a plurality of inlet guide vanes (IGVs) arranged around the center axis upstream of the compressor rotor and extending radially inwardly of the casing, each IGV of the plurality of IGVs rotatable about a spanwise axis of that IGV between a plurality of IGV positions;
   one or more cavities in the casing disposed radially outwardly of the tips of the compressor rotor blades; and
   a liner operatively connected to the casing and moveable relative to the casing between a first position and a second position, the liner shaped to add a volume to the tip clearance gap when moving from the second position toward the first position, the liner being displaceable between the first and second positions in coordination with rotation of the plurality of IGVs between the plurality of IGV positions.

2. The aircraft engine of claim 1, wherein the liner is in the first position upon the IGV position of the plurality of IGVs being closed.

3. The aircraft engine of claim 1, wherein the liner is in the second position upon the IGV position of the plurality of IGVs being open.

4. The aircraft engine of claim 1, comprising one or more bleed air passages in fluid communication with the compressor rotor and being selectively closable.

5. The aircraft engine of claim 4, wherein the liner is in the first position upon: the IGV position of the plurality of IGVs being closed, and the one or more bleed air passages being open.

6. The aircraft engine of claim 4, wherein the liner is in the second position upon: the IGV position of the plurality of IGVs being open.

7. The aircraft engine of claim 1, comprising an actuator for rotating the plurality of IGVs between the plurality of IGV positions while simultaneously displacing the liner between the first and second positions.

8. The aircraft engine of claim 1, wherein the one or more cavities are one or more openings extending through the casing, an enclosure sealed against a radially-outer surface of the casing about the one or more openings and defining a plenum outside of the casing, and the liner displaceable within the plenum relative to the enclosure between the first and second positions, the one or more openings in the first position fluidly connecting the plenum to the tip clearance gap.

9. The aircraft of claim 8, wherein the liner includes:
   one or more liner enclosures sealed against the radially-outer surface of the casing, each liner enclosure of the one or more liner enclosures defining a liner plenum outside of the casing; and
   a blocking portion adjacent to at least one liner enclosure of the one or more liner enclosures;
   in the first position of the liner, the liner plenum of each liner enclosure in fluid communication with the tip clearance gap via the one or more openings; and
   in the second position of the liner, the blocking portion covering the one or more openings.

10. The aircraft of claim 8, comprising a displacement rod attached to the liner and extending through the enclosure, the displacement rod sealed against the enclosure.

11. A compressor section of an aircraft engine, the compression section comprising:

a casing enclosing a compressor rotor having compressor rotor blades rotatable about a center axis, and a tip clearance gap extending radially between tips of the compressor rotor blades and the casing;

a plurality of inlet guide vanes (IGVs) arranged around the center axis upstream of the compressor rotor and extending radially inwardly of the casing, each IGV of the plurality of IGVs rotatable about a spanwise axis of that IGV between a plurality of IGV positions;

one or more bleed air passages in fluid communication with the compressor rotor and being selectively closable; and a casing treatment including:
one or more cavities in the casing disposed radially outwardly of the tips of the compressor rotor blades; and a liner operatively connected to the casing and moveable relative to the casing between a first position and a second position, the liner shaped to add a volume to the tip clearance gap when moving from the second position toward the first position, the liner displaceable between the first and second positions in coordination with rotation of the plurality of IGVs between the plurality of IGV positions.

12. The compressor section of claim 11, wherein the liner is in the first position upon: the IGV position of the plurality of IGVs being closed, and the one or more bleed air passages being open.

13. The compressor section of claim 11, wherein the liner is in the second position upon: the IGV position of the plurality of IGVs being open.

14. The compressor section of claim 11, wherein the one or more cavities are one or more openings extending through the casing, the casing treatment including:
an enclosure sealed against a radially-outer surface of the casing about the one or more openings and defining a plenum outside of the casing; and the liner displaceable within the plenum relative to the enclosure between the first and second positions, the one or more openings in the first position fluidly connecting the plenum to the tip clearance gap.

15. The compressor section of claim 14, wherein the liner includes:
one or more liner enclosures sealed against the radially-outer surface of the casing, each liner enclosure of the one or more liner enclosures defining a liner plenum outside of the casing; and a blocking portion adjacent to at least one liner enclosure of the one or more liner enclosures;

in the first position of the liner, the liner plenum of each liner enclosure in fluid communication with the tip clearance gap via the one or more openings; and in the second position of the liner, the blocking portion covering the one or more openings.

* * * * *